US006869677B1

(12) United States Patent
Uehara et al.

(10) Patent No.: US 6,869,677 B1
(45) Date of Patent: Mar. 22, 2005

(54) HEAT EXCHANGER MADE OF ALUMINUM ALLOY

(75) Inventors: Toshiyuki Uehara, Tokyo (JP); Chizuko Yoshida, Tokyo (JP); Etsuko Yamazaki, Tokyo (JP); Kazuya Nakada, Tokyo (JP)

(73) Assignees: CalsonicKansei Corporation, Tokyo (JP); Nihon Parkerizing Co., Ltd., Tokyo (JP)

( * ) Notice: Subject to any disclaimer, the term of this patent is extended or adjusted under 35 U.S.C. 154(b) by 28 days.

(21) Appl. No.: 09/980,490

(22) PCT Filed: Jun. 1, 2000

(86) PCT No.: PCT/JP00/03529

§ 371 (c)(1), (2), (4) Date: May 17, 2002

(87) PCT Pub. No.: WO00/75397

PCT Pub. Date: Dec. 14, 2000

(30) Foreign Application Priority Data

Jun. 4, 1999 (JP) .......................................... 11-157833

(51) Int. Cl.[7] ............................................. B32B 15/08

(52) U.S. Cl. ........................ 428/340; 428/341; 428/457

(58) Field of Search ................................ 428/457, 340, 428/341

(56) References Cited

U.S. PATENT DOCUMENTS 6,589,324 B2 * 7/2003 Kamo et al. ............. 106/14.12

FOREIGN PATENT DOCUMENTS

| | | |
|---|---|---|
| EP | 0015020 | 9/1980 |
| JP | 63171684 | 7/1988 |
| JP | 01208477 | 8/1989 |
| JP | 01270977 | 10/1989 |
| JP | 01306575 | 12/1989 |
| JP | 06116527 | 4/1994 |
| JP | 09178392 | 7/1997 |

OTHER PUBLICATIONS

International Search Report dated Jul. 11, 2000.

International Preliminary Examination Report dated Jul. 11, 2001.

* cited by examiner

*Primary Examiner*—Monique R. Jackson
(74) *Attorney, Agent, or Firm*—Stevens, Davis, Miller & Mosher, LLP

(57) ABSTRACT

An aluminum alloy thermal exchanger has an aluminum alloy metal surface without any harmful chromium ions and having good corrosion resistance and good hydrophilicity. The thermal exchanger includes an aluminum alloy metal having a surface provided with a first protective layer of chemical conversion coating produced by using a first treatment liquid, the first treatment liquid including a water soluble vanadium compound and a fluoro-zirconium complex compound. The first protective layer has a second protective layer of hydrophilic film thereon. The second protective layer is produced by adding and drying a second treatment liquid, the second treatment liquid including an aqueous polyvinyl alcohol polymer having a vinyl alcohol unit of more than 40% and another polymerization unit of less than 60 mol %, polyoxyethylene glycol having a weight average molecular weight of 6,000 and 1,000,000, a vanadium compound, and a zirconium compound, wherein, in the second treatment liquid, the ratio of the weight % of zirconium and vanadium is 40–350.

5 Claims, No Drawings

HEAT EXCHANGER MADE OF ALUMINUM ALLOY

FIELD OF THE INVENTION

This invention relates to an aluminum-alloy thermal exchanger, especially for use in air conditioners for cars. It further relates to an aluminum-alloy thermal exchanger having, on the surface of the aluminum alloy, a hydrophilic film free from chromium, and having excellent corrosion resistance.

RELATED ART

Up to now, many thermal exchangers fabricated with aluminum-alloy are designed with the fins close together to enlarge the radiation and cooling area. However, such an arrangement tends to yield a lot of water condensation droplets resulting from the moisture in the air between the narrowly spaced fins because the aluminum alloy is hydrophobic. As a result, the thermal exchanging efficiency decreases and produces splash in ventilation downstream. In order to prevent such problem, therefore, several countermeasures are proposed to remove water condensation droplets from the narrow fin space by giving a hydrophilic property to the surface of the aluminum alloy.

There have been two methods to give a hydrophilic property on the surface of aluminum-alloy: one is to use a mixed film of organic compound and alkaline silicate, and another is to use an organic high molecular film. However, both methods result in poor corrosion resistance. A chemical conversion coating operation using chromic acid is generally carried out on the aluminum alloy in order to improve the corrosion resistance property. However, this method utilizes hexavalent chromium, a substance considered harmful to the human body. Therefore, a treatment solution free from chromium is eagerly desired.

JP63-171684A has disclosed a process to form an anti-corrosive and hydrophilic film on the surface of an aluminum alloy by using a synthetic resin of a specific monomer. This film, however, has low hydrophilicity.

JP6-116527A discloses a process to give hydrophylicity to an aluminum material surface. However, this method is insufficient to eliminate odor due to its inorganic component.

Further, JP1-270977A discloses a method to make aluminum alloy both hydrophilic and corrosion resistant. However, it is not desirable to use a film of this method since it contains chromium compound.

Thus, there is still nothing developed for an aluminum-alloy thermal exchanger with a hydrphobic film being excellent in both corrosion resistance and free from chromium compounds.

SUMMARY OF THE INVENTION

This invention is provided for resolution of problems of the existing techniques as above mentioned. Namely, it is the purpose of this invention to provide a new aluminum alloy thermal exchanger which has excellent corrosion resistance and hydrophilicity, resolving the problems such as reduction of thermal exchanging efficiency and splash from the condensed water drops, odor elimination, and of course resolving the problem of harmful chromium.

As the result of various considerations to resolve the above problems, the present inventors a way of two-step coating on aluminum-alloy; the first step is a chemical conversion coating of specific vanadium compound with inorganic zirconium compound, and the second step is an organic-inorganic composite film comprising specific polyvinyl-alcohol polymers, specific polyoxyethylene glycol, and mixture of vanadium and zirconium compounds.

According to the present invention, the aluminum alloy of the thermal exchanger has a first protective layer of chemical conversion coating produced by using a treatment liquid containing (a) and (b) explained below on the surface of the aluminum alloy, and a second protective layer of a hydrphilic film produced by adding a treatment liquid containing (c), (d), (e), (f), as described below, wherein the weight of zirconium in (f) is 40–350% of the weight of vanadium in (e), and then drying.

Components (a)–(f) are as follows:

(a) water soluble vanadium compound, (b) fluoro zirconium compound, (c) aqueous polyvinyl alcohol polymer having vinyl alcohol unit of more than 40 mol % and additional polymerization unit (other than the vinyl alcohol unit of above) of less than 60 mol %, (d) polyoxyethylene glycol of 6,000–1,000,000 in average molecular weight, (e) vanadium compound, and (f) zirconium compound.

DETAILED DESCRIPTION

An aluminum-alloy thermal exchanger of this invention has the first protective layer of a chemical conversion film and the second protective layer of a hydrophilic film on the surface of the aluminum-alloy.

The first protective layer is built up on the surface of said aluminum-alloy, through chemical conversion treatment using a treatment liquid containing (a) water-soluble vanadium compound and (b) fluoro-zirconium complex compound.

As for water-soluble vanadium compound (a), it is preferable to apply organic vanadium complex compound being selected from the inorganic vanadium compounds such as meta-vanadic acid and vanadic acid and their salts of either sodium, potassium, or ammonium, vanadium sulfate, vanadyl sulfate, vanadium nitrate, and vanadium acetate, and also from the organic vanadium complex compounds such as vanadium acetyl-acetonate, and vanadyl acetyl-acetonate. For the above mentioned water soluble vanadium compound (a), it is more desirable to use the organic vanadium complex compound.

For fluoro-zirconium complex compound (b), it is preferable to utilize at least one of zirconium hydrofluoride, zirconium-ammonium fluoride, and zirconium-potassium fluoride.

There is no limitation on blending ratio of (a) and (b) compounds into the treatment liquid.

The first protective layer is, as above mentioned, complex chemical conversion film, containing vanadium and zirconium. Fluoro-zirconium complex compound may precipitate and form a frame work of oxide or fluoride on the surface of the aluminum-alloy, and the frame work may insulate the surface from corrosive matter. Thus, white-rust resistance is given by zirconium, while the vanadium gives the aluminum alloy a resistance against pitting corrosion. As result of these composite effects, it is deemed that the first protective layer contributes to an excellent corrosion resistance without chromium.

In this invention, for the first protective layer, the film weight is preferable at 10–2000 mg/m$^2$, and more preferable at 50–500 $mg/m^2$. When the film weight is less than 10 $mg/m^2$, it becomes insufficient on adhesion with the second protective layer and becomes less corrosion resistant, while a film weight of more than 2000 $mg/m^2$ saturates the effect but also increases the cost. Further, when the film weight exceeds 2000 $mg/m^2$, the appearance becomes less uniform, and a bad odor emanates from the second protective layer, so it is better to control the film weight not more than 2000 $mg/m^2$.

The vanadium amount in the first protective layer is preferably 2–500 $mg/m^2$, and more preferably at 10–300 $mg/m^2$. When the amount is below 2 $mg/m^2$, a decrease in pitting corrosion resistance may be observed. The zirconium amount may be preferable at 2–500 $mg/m^2$, and more preferable at 10–300 $mg/m^2$. When the amount is below 2 $mg/m^2$, corrosion resistance against white rust may decrease. However, when each of them are over 500 $mg/m^2$, it may become costly and may cause a bad odor.

The first protective layer of aluminum-alloy thermal exchanger in this invention is covered by the second protective layer. This second protective layer is built up by using the treatment liquid containing (c), (d), (e) and (f) as explained below. (c) is aqueous polyvinyl alcohol polymer having vinyl-alcohol unit of more than 40 mol % and additional polymerization unit (other than the vinyl-alcohol unit of above) of less than 60 mol %. (d) is polyoxyethylene glycol of 6,000–1,000,000 in average molecular weight, (e) is vanadium compound and (f) is zirconium compound. And the weight ratio of zirconium in the compound (f) to vanadium in the compound (e) is 40 350%.

Formula (I) below shows example of polyvinyl alcohol polymer (c) explained above, and it may also be another denatured polymer obtainable as a reaction product between the polyvinyl-alcohol polymer (I) and diketene.

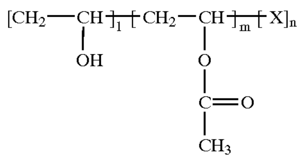

(I)

The polyvinyl-alcohol polymer shown in formula (I) may include either partial or entire saponificated compounds of poly-vinyl acetate and any copolymers of polyvinyl acetate with other monomer, and there is no limitation in the kind of co-monomer to be copolymerized with vinyl acetate.

In polyvinyl-alcohol compound shown in formula (I), "X" indicates a copolymer different from vinyl-acetate and vinyl-alcohol and "l", "m", and "n" indicate molecular number of vinyl-alcohol unit, vinyl-acetate unit, and additional polymer unit other than vinyl-acetate, respectively. In formula (I), $[\{n/(1+m+n)\}\times 100]$ is desirable to be below 40 mole %, and more desirable to be below 30 mole %. Also, in the polyvinyl-alcohol polymer shown in formula (I), $[\{m/(1+m+n)\}\times 100]$ is desirable to be below 20 mole %, and more desirable to be below 10 mole %. A higher mole ratio may reduce water-solubility of the polyvinyl-alcohol. Regarding a value of $[\{1/(1+m+n)\}\times 100]$, it may result as 40–100 mole % from both values of above.

Hydroxyl group in polyvinyl-alcohol polymer (c) may give the second protective layer a water-proof property after a cross linking reaction with an additional copolymer unit and zirconium. Hydroxyl groups not participated by such reaction gives hydrophilic properties to the second protective layer.

For polyoxyethylene glycol (d) of the second protective layer, the weight average molecular weight is desirable between 6,000–1,000,000. The polyoxyethylene glycol (d) becomes immobilized in the second protective layer by formation of polymeric complex compound with zirconium ion in the zirconium compound (f), and may produce odor-preventing properties and hydrpohilic properties.

When the weight average molecular weight of the polyoxyethylene glycol (d) is below 6,000, immobility in the second protective layer may decrease under wet conditions, resulting in diminished time of good odor-preventing properties and of good hydrophilic properties over time. When the weight average molecular weight is over 1,000,000, the cost of producing the treatment liquid increases since it becomes difficult for the treatment liquid to dissolve into the water.

As for the vanadium compound (e) of the second protective layer in this invention, many sort of inorganic and organic vanadium compounds of any vanadium valence may be used, but it is more preferable to use tetravalent or pentavalent vanadium. Inorganic vanadium compounds such as meta-vanadic acid and vanadic acid and their salts of sodium, potassium, or ammonium, vanadium pentoxide, vanadium sulfate, vanadyl sulfate, vanadium nitrate, vanadyl nitrate, vanadium acetate and vanadium phosphate may be used. Also organic vanadium compounds such as vanadium acetyl-acetonate and vanadyl acetyl-acetonate may be used.

Vanadium in the second protective layer shows properties of resisting against pitting corrosion like the vanadium in the first protective layer. The effectiveness of vanadium is observed with a self-remedy-process, which is similar to chromate film. When a part of aluminum alloy may be corroded, vanadium may move from the film to the corroded portion and may form there a new strong film again and isolate the aluminum alloy from the corrosive matter. It is also believed that it may produce some compounds in the second protective layer which do not easily dissolve in water, together with zirconium as mentioned later.

As for the zirconium compound (f) in the second protective layer in this invention, following agent such as zirconium-ammonium carbonate, zirconium-potassium carbonate, zirconyl nitrate, zirconyl sulfate, zirconyl acetate, zircon hydrofluoric acid and their salts may be used.

Zirconium in the second protective layer shows white-rust resistant effect similar to the process of zirconium in the first protective layer by isolating the surface of aluminum alloy from external corrosive matter by formation of frame work through cross-linking process between zirconium and hydroxyl group in polyvinyl-alcohol polymer (c).

Also, zirconium has a role of building up some water insoluble compounds with vanadium, making vanadium difficult to dissolve. For weight ratio of zirconium to vanadium, it is preferable between 40–350%. When the weight ratio falls below 40%, vanadium may decrease its durability time of corrosion resistance. When the weight ratio is over 350%, it demerits economically. When the content of polyvinyl alcohol polymer (c) is 100 weight ratio in the treatment solution for the second protective layer in this invention, it may be preferable that the polyoxyethelene glycol (d) may be at 10–1000 weight ratio, vanadium compound (e) may be at 1–200 weight ratio in vanadium-ion and zirconium compound (f) may be at 0.4–700 weight ratio in zirconium-ion.

Further, the second protective layer may include another additives (g), such as an anti-microbial agent and mildew-preventing agent, cross-linking agent such as aqueous epoxy resin and surface-active agent in the allowable amount of not impairing the primary effect.

Anti-microbial agents and mildew preventing agents may be added to prevent foul odor from the propagation of bacteria. The decomposition temperature of the anti-microbial agent and mildew-preventing agent is desirable to be at 100° C., and more preferable to be at 150° C. in order to keep its effect to the temperature.

The combined weight of the anti-microbial agent and mildew preventing agent is desirable at 0.1–70 wt % to the total weight of (c)+(d) of the second protective layer, and more preferable at 0.5–30 wt % and further more preferable at 0.5–30 wt %. When the combined weight is below 0.1 wt %, the effect becomes insufficient, while exceeding 70 wt % degrades the water proof property of the film.

In this invention, a cross linking agent is added in order to make the second protective layer a three dimensional structure through reaction with hydroxyl group in polyvinyl alcohol aqueous polymer (c) or with terminal hydroxyl group in polyoxyethelene glycol (d). It is desirable to use aldehyde as the cross-linking agent, such as polyglycidyl compound, blocking isocyanate, polymethylol compound and glyoxal. The addition of a cross linking agent may increase water proof properties on the second protective layer. The content of the cross-linking agent is desirable at 0.1 70 wt % of the total content of (c)+(d). When the contents of the cross-linking agent is below 0.1% wt/o, the cross-linking effect becomes insufficient, while exceeding 70 wt % is not desirable, as film adhesion weakens.

Many sort of surfactants may be added in order to smooth the surface of the second protective layer. The content is preferable to be at 0.1–70 wt % to the total content of (c)+(d), and more preferable at 0.3–50 wt %, and further more preferable at 0.5–30 wt %. When the surfactant content is below 0.1% wt %, it is difficult to obtain a clear effect, while exceeding 70 wt % degrades the water proof property of the film.

It is preferable that the film weight of the second protective layer in this invention is 30–5000 $mg/m^2$, and more preferable at 40–3500 $mg/m^2$, and further more preferable at 50–2500 $mg/m^2$. When the film weight is below 30 $mg/m^2$, corrosion resistance, hydrophilic properties and odor-preventing properties become insufficient, while exceeding 5000 $mg/m^2$ may be wasteful.

It is preferable that the content of the vanadium compound in the second protective layer is 2–500 $mg/m^2$ being calculated in vanadium element, and more preferable to be at 2–250 $mg/m^2$ in vanadium element. Also zirconium compound may preferably be 1–1750 $mg/m^2$ being calculated in zirconium element, and is more preferable to be 1–875 $mg/m^2$, wherein the weight ratio of zirconium to vanadium should be at 40–350%. When vanadium is below 2 $mg/m^2$ or zirconium is below 1 $mg/m^2$, the corrosion resistance may decrease, however when vanadium exceeds 250 $mg/m^2$ or zirconium exceeds 1750 $mg/m^2$, it may be wasteful.

Now will be described the film formation method in this invention. First, the surface of the aluminum-alloy thermal exchanger is chemically cleaned by using alkali cleaner or acid cleaner. Subsequently, the first protective layer is formed on the surface of the thermal exchanger through chemical conversion coating. And then it is coated with the treatment liquid containing (c) (f) and other additives in order to form the second protective layer. Any coating method may be utilized, however, dipping is the general method. After coating, it is preferable to dry the film under a hot blast of 80–250° C. and more preferably of 100–200° C.

EMBODIMENT EXAMPLE AND COMPARATIVE EXAMPLE

Aluminum alloy thermal exchanger of embodiment examples 1–9 and comparative examples 1–9 were used as specimens. After cleaning the surface, the first protective layer and the second protective layer were formed. And then tests were carried on the specimens. However, for the anti-microbial test, Al-Mn alloy sheets (JIS-A3004) of 70 mm×150 mm×0.2 mm were used.

(1) Surface Cleaning

All specimens were cleaned by dipping into 3 wt % water solution of alkali degreasing agent (Fine Cleaner 315™); Nihon Parkerising Co. Ltd.) maintained at 60° C. and kept for 90 seconds in order to remove grease away from the surface, and rinsed with fresh water. Then, the specimens were dipped into 10 wt % of 10% sulfuric acid at room temperature for 90 seconds, and rinsed with fresh water.

(2) Formation of the First Protective Layer of Embodiment Examples

The treatment solution used in formation of the first protective layer of the embodiment examples are shown in Table 1. And the treatment solutions used in formation of the first protective layer of the comparative examples are shown in Table 2. The following shows the agents used in (a)-①-(a)-③ and (b)-①-(b)-② of Table 1 and 2.

(a) Water soluble vanadium compound

①—vanadyl-acethylacetonate $[(C_5H_7O_2)_2VO]$

②—vanadium-acethylacetonate $[(C_5H_7O_2)_3VO]$

③—meta-vanadic acid ammonium $[(NH_4)VO_3$ (b) Fluoro-zirconium complex compound ①—zirconium hydrofluoride $[H_2ZrF_6]$ (b)—zirconium-ammonium fluoride $[(NH_4)\ ZrF_6]$ (3) Formation of the First Protective Layer of Comparative Examples Fluoro zirconium complex compound (b) was not used in comparative example 1 and 3.

Water soluble vanadium compound (a) was not used in comparative example 2.

Zirconium phosphate is applied for the first protective layer instead of the present invention in comparative example 9.

(4) Formation of the Second Protective Layer

After the formation of the first protective film, the specimens were dipped into the treatment solution in order to form the second protective film. Then, the specimens were dried for 30 minutes in 150° C. The composition of the element in the second protective film are shown in Table 1 and Table 2. The following shows the agents used in (c)-①-(c)-②, (d)-①-(d)-②, (e)-①-(e)-②, (f)-①-(f)-③ and (g) of Table 1 and Table 2.

(c) polyvinyl-alcohol polymer

①—saponificated polyvinyl alcohol (saponifification degree: 90 mol %, molecular weight: 100 thousand)

②—5 mol % diketene treated polyvinyl alcohol (saponifification degree: 90 mol %, molecular weight: 50 thousand)

(d) polyoxyethylene glycol

①—polyethylene glycol 20000 (average molecular weight: 20 thousand)

②—polyethylene oxide (average molecular weight: 300 thousand)

(e) vanadium compound

①—sodium meta vanadate [$NaVO_3$]

②—ammonium meta vanadate [$NH_4VO_3$]

(f) zirconium compound

①—zirconium hydrofluoriide [$H_2ZrF_6$]

②—zirconium-ammonium fluoride [$(NH_4)ZrF_6$]

③—zirconium ammonium carbonate [$(NH_4)_2$ $Zr(CO_3)_3$]

(g) additives (anti-microbial agent)

①—sodium-2-pyridine-thiol-1-oxide (cross-linking agent)

②—glycerol diglycidyl ether (aqueous epoxy cross-linking resin, surface active agent)

③—polyoxyethylenealcohol ether (non-ionic surfactant, HLB=12)

(5) Test and Evaluation

The results of the test are explained in Table 1 Table 4.

(Weight Film)

Measured by using a fluorecent X-ray analyzer and a surface carbon analyzer.

(Corrosion Resistance)

The salt spray tests according to JID-Z-2371 were carried out for 24 hr, and observed the white rust occurrence at the fin of the thermal exchanger.

0̂: no white rust

○: white rust area below 10%

Δ: white rust area below 10 30% x: white rust area over 30%

(Hydrophilic Property)

After 72 hours dipping into flowing water at room temperature then 1 hour drying at 80° C., the contact angle of the fin portion of thermal exchanger with water was measured (using an image-processing contact-angle meter Type CA-X; Kyowa Surface Chemistry-Co.).

(Odor-Preventing Property)

After 72 hours dipping into flowing water at room temperature then 1 hour drying at 80° C., it was examined by smell.

○: no odor

Δ: a little odor x: clear odor (Anti-Microbial Property)

Test specimens were dipped for 72 hr into a flowing water of room temperature, then the specimens were dried for 1 hr at 80° C. The specimens were cut into the size of 4 cm×4 cm, then nutrients and microbes were sprayed on the cut samples, and then they were cultivated for 14 days at 30±2° C. The number of extracting microbes from the cultivated mat was measured.

○: the number of microbes<$10^2/m^2$

Δ: $10^2/m^2$ the number of microbes 10 $^2/m^2$ x: the number of microbes $10^2/m^2$ Microbes Used in Test Microbes: *Escherishia coli, Bacillus subtilis, Pseudomanos aeruginosa*

Mildew: *Aspergillus niger, Penicillium citrinum, Cladosporium clados-porides*

As seen from Table 1 and 3, the embodiments of examples 1–9 of aluminum-alloy thermal exchanger having the first protective layer and the second protective layer of this invention showed excellent corrosion resistance as well as excellent hydro-philicity and odor preventive property.

Whereas in Table 2 and 4, comparative examples 1 3, which did not use vanadium compound (a) or fluoro-zirconium complex compound (b) for the first protective layer, they were inferior in corrosion resistance. In comparative example 4 which did not use aqueous polyvinyl-alcohol polymer (c), it was seen insufficient in corrosion resistance, hydrophilicity and odor prevention. In comparative example 5 which did not use polyoxyethylene glycol (d), it was insufficient in hydrophilicity. Also, in comparative example 6 which did not use vanadium compound (e), it resulted inferior corrosion resistance. In comparative example 7 which did not use zirconium compound (f), it was inferior in corrosion resistance and to in odor prevention. Comparative example 8 was also insufficient in corrosion resistance where the weight ratio of vanadium to zirconium is below 40%. Further in comparative example 9 where zirconium phosphate is applied as the first protective layer instead of the present invention, corrosion resistance was unsatisifactory.

ADVANTAGES OF THE INVENTION

According to the formation of the first protective layer and the second protective layer of this invention on the surface of aluminum alloy, it became possible to obtain aluminum-alloy thermal exchanger of not containing any harmful chromium ions on its surface and having good corrosion resistance, good hydrophilicity, and excellent long term preventive capacity against odor.

What is claimed is:

1. An aluminum alloy thermal exchanger comprising:

aluminum alloy metal having a surface provided with (a) a first protective layer of chemical conversion coating produced by using a first treatment liquid, the first treatment liquid comprising a water soluble vanadium compound and a fluoro-zirconium complex compound; and (b) a second protective layer of hydrophilic film on the first protective layer, the second protective layer being produced by adding and drying a second treatment liquid, the second treatment liquid comprising an aqueous polyvinyl alcohol polymer having a vinyl alcohol unit of more than 40 mol % and another polymerization unit of less than 60 mol %, polyoxyethylene glycol having a weight average molecular weight of 6,000 to 1,000,000, a vanadium compound, and a zirconium compound, wherein, in the second treatment liquid, the ratio of the weight of zirconium to the weight of vanadium is 40:100 to 350:100.

2. The aluminum alloy thermal exchanger according to claim 1, wherein the water soluble vanadium compound of the first treatment liquid consists of at least one organic vanadium compound selected from the group consisting of vanadium acetyl acetonate and vanadyl acetyl acetonate.

3. The aluminum alloy thermal exchanger according to claim 1, wherein the weight of the first protective layer is 10–2000 mg/$m^2$, the weight of the vanadium in the first protective layer is 2–500 mg/$m^2$, and the weight of the zirconium in the first protective layer is 2–500 mg/$m^2$.

4. The aluminum alloy thermal exchanger according to claim 1, wherein the weight of the second protective layer is 30–5000 mg/$m^2$, the weight of the vanadium in the second protective layer is 2–500 mg/$m^2$, and the weight of the zirconium in the second protective layer is 1–1750 mg/$m^2$.

5. The aluminum alloy thermal exchanger according to claim 1, wherein said fluoro-zirconium complex compound comprises at least one of zirconium hydrofluoride, zirconium-ammonium fluoride and zirconium-potassium flouride.

* * * * *